United States Patent [19]

Springer et al.

[11] 4,247,920
[45] Jan. 27, 1981

[54] MEMORY ACCESS SYSTEM

[75] Inventors: Richard A. Springer, Tualatin; John G. Theus, Sherwood, both of Oreg.

[73] Assignee: Tektronix, Inc., Beaverton, Oreg.

[21] Appl. No.: 32,843

[22] Filed: Apr. 24, 1979

[51] Int. Cl.³ .............................................. G11C 8/00
[52] U.S. Cl. .................................................. 365/230
[58] Field of Search ....................................... 365/230

[56] References Cited

U.S. PATENT DOCUMENTS

| | | | |
|---|---|---|---|
| 3,771,145 | 11/1973 | Wiener | 365/94 |
| 3,828,320 | 8/1974 | Dinerman et al. | 365/230 |
| 3,846,765 | 11/1974 | DeVries | 365/222 |
| 3,858,187 | 12/1974 | Lighthall et al. | 365/230 |

FOREIGN PATENT DOCUMENTS 1254929  11/1971  United Kingdom ............... 365/230

Primary Examiner—Stuart N. Hecker
Attorney, Agent, or Firm—Thomas J. Spence

[57] ABSTRACT

A means and method for accessing a digital memory system in a manner permitting the transfer of a two-byte information signal into and out of a storage area defined by any two logically adjacent memory bytes. Provision is also made for maintaining a preselected locational integrity between the bytes forming the information signal.

8 Claims, 4 Drawing Figures

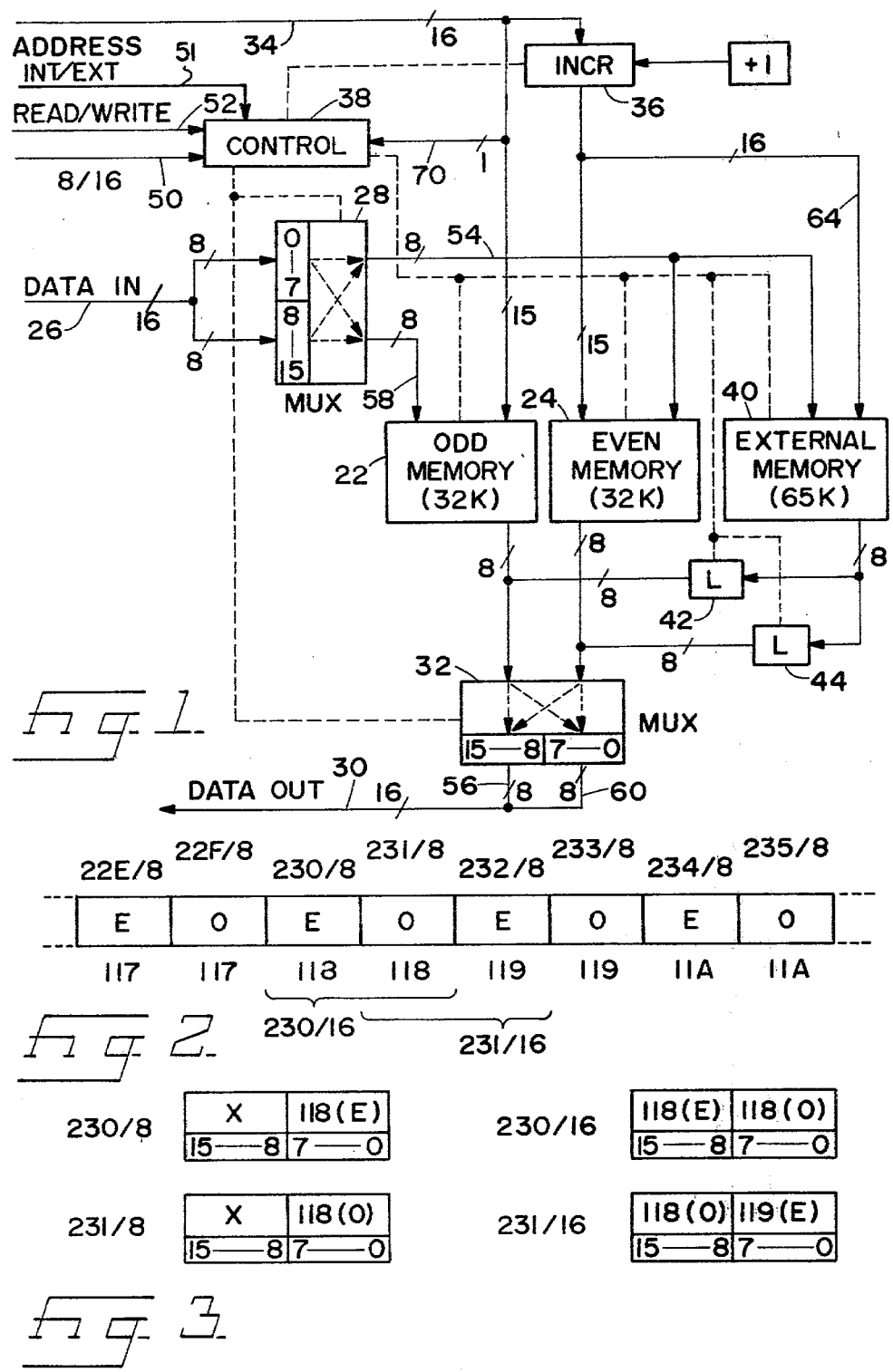

MEMORY ACCESS SYSTEM

BACKGROUND OF THE INVENTION

The subject matter of the present invention pertains to means for accessing a digital memory system.

In a conventional digital memory system, information is grouped into elements of words, bytes, and bits, with a word comprising one or more bytes and a byte comprising one or more, usually several bits. The elements are stored in a plurality of memory locations, with each location being identified by a unique memory address. Often the memory locations are divided logically into two sections spread across a like number of memory devices, with each section or device being identified further as odd or even depending upon the sense of a particular unit of each memory address. To access a particular memory location in such a conventional system, it is necessary merely to supply the system with signals representative of the appropriate memory address, and the function, i.e., read or write, to be performed. Once the particular location has been accessed, the information contained therein can be retrieved or updated as desired. Assuming a multi-byte memory word, it is possible with known prior art systems to access a memory device at both the byte level and the word level; that is, a memory access may be made to retrieve or update information defining any byte of a particular word as well as the entire word itself.

A problem arises when it is desired to retrieve or update a data element comprising bytes from more than one memory device, for example, a high-order byte from a first device and a low-order byte from a second device. Known prior art systems either do not permit such access or, if permitted, require that the information to be retrieved or updated be preprocessed or postprocessed outside the system in order to maintain the correct order of the bytes within the element.

SUMMARY OF THE INVENTION

The present invention relates to a means and method of transferring information into and out of a digital memory system without regard for byte boundaries. More particularly, the memory access system of the present invention comprises a byte-oriented memory device and means for accessing same in a manner permitting a two-byte information signal to be transferred into or out of a memory space starting at any single byte location and including an addressed byte and a next sequential byte. Specifically, the present invention permits bytes A and B of a two-byte information signal to be stored in or retrieved from a single memory space defined by separate memory locations N and N+1 without regard for whether N is an odd or even memory address. Provision is also made for maintaining a preselected logical interrelationship between the two bytes forming the information signal as it enters or leaves the system.

Two exemplary embodiments are disclosed, the first with a separate switchable multiplexer for each of an input signal path and an output signal path, and the second with a single shared multiplexer serving both functions. In both embodiments, a unique address scheme is employed-with a memory device divided into two parallel accessible modules, one designated odd and the other designated even to indicate a logical grouping of the respective addresses—to automatically effect the desired transfer of information and maintenance of logical order. For an even memory address N, an access is made to a location in each memory module having an address of N/2. For an odd memory address N, the access in the odd module is to a location having an address defined by the integer part of N/2, but the access in the odd module is to a location having an address defined by the integer part of N/2+1. In the first case, the even memory module supplies or receives the upper byte of the information signal, and in the second case, the odd module supplies or receives the upper byte. Thus, the system not only permits access of a byte-oriented memory system at both the odd and even byte level, but it also insures that a preselected interbyte logical relationship is maintained within the information signal without requiring that the signal be specially processed before entering or after leaving the system.

It is, therefore, a primary objective of the present invention to provide means for transferring a two-byte information signal into and out of a byte-oriented memory system such that the first and second bytes of such signal are associated with first and second sequential storage locations, respectively, for a memory address of a first sense, and with second and third sequential storage locations, respectively, for a memory address of a second sense.

It is an additional primary objective of the present invention to provide a method for transferring a two-byte information signal into and out of a byte-oriented memory system without regard for whether the first byte being addressed is in an odd or even memory location.

It is a feature of the system of the present invention that a preselected interbyte logical relationship is maintained within the information signal whether the memory location being addressed is odd or even.

The foregoing objectives, features, and advantages of the present invention will be more readily understood upon consideration of the following detailed description of the invention taken in conjunction with the accompanying drawings.

BRIEF DESCRIPTION OF THE DRAWINGS

FIG. 1 is a schematic representation of a first exemplary embodiment of the memory access system of the present invention.

FIG. 2 is a conceptional representation of the memory allocation scheme and accompanying addressing scheme for the memory system of FIG. 1.

FIG. 3 is a conceptional indication of certain byte positional relationships within selected two-byte information signals.

DETAILED DESCRIPTION OF THE INVENTION

Figure 4:
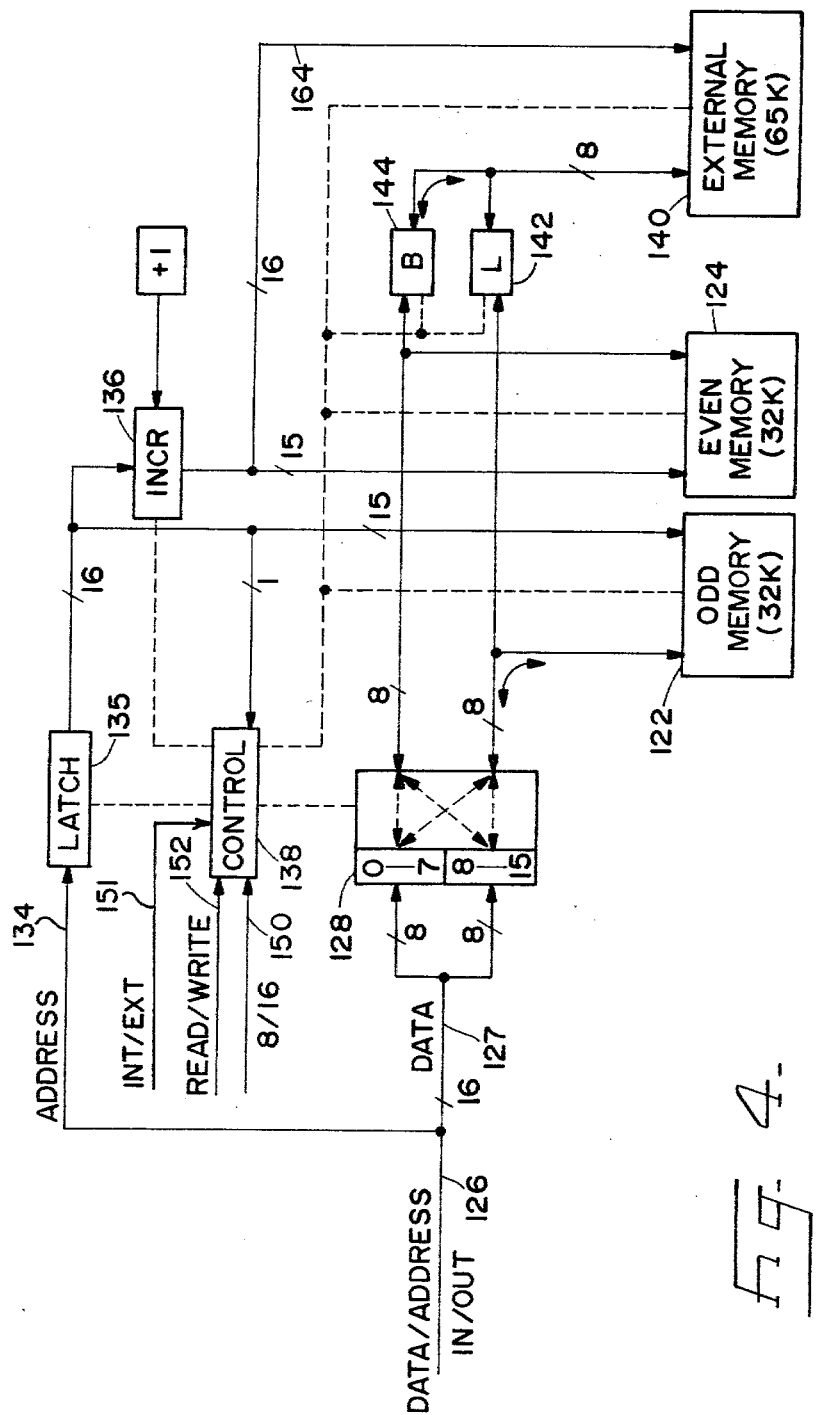
FIG. 4 is a schematic representation of a second exemplary embodiment of the memory access system of the present invention.

Referring to the diagram of FIG. 1, there is shown a first exemplary embodiment of the memory system of the present invention. As disclosed, the system includes a first internal memory module 22 (designated "ODD"), a second internal memory module 24 (designated "EVEN"), a data-in signal line 26 and associated multiplexer (mux) 28, a data-out signal line 30 and associated multiplexer (mux) 32, an address signal line 34 and associated incrementor 36, and a control circuit 38. Also shown are an external memory module 40 and its associated latch circuits 42, 44. Each of the data and address signal lines interconnecting the various components of the system are labeled with a numeral 1, 8, 15, or 16 and a diagonal mark (/) through the line to indicate the number of separate signal paths contained within the respective line.

For purposes of illustration, the internal memory modules 22, 24 are each assumed to have a capacity of 32, 768 (32K) 8-bit words with each word location being uniquely accessible via a 15-bit address word, and the external memory module 40 is assumed to have a capacity of 65, 536 (65K) 8-bit words, each accessible via a unique 16-bit address word. It is understood that the scope of the invention is not limited by the capacities of the respective memory modules, their designation as "odd," "even," "internal," or "external," or the number of signal paths in the interconnecting signal lines.

With the exception of the control circuit 38, the individual components of the system of FIG. 1 are conventional. It is their interconnection and functional interrelationships, under control of the control circuit 38, that forms the basis of the present invention.

Before proceeding to a detailed description of the operation of the system of FIG. 1, it is necessary to describe briefly the manner in which memory is allocated within the system. Ignoring for the moment the external memory module 40, system memory may be viewed conceptually as a serial string of 8-bit words or bytes, depicted as a series of rectangles in FIG. 2 wherein the upper row of numbers indicates the 16-bit system address (in hexadecimal) of each word, the lower row of numbers indicates the 15-bit odd or even memory module address for each word, and the numbers by the two brackets indicate the system addresses of two respective 16-bit words formed of an 8-bit byte from each memory module. The letters "O" and "E" within each rectangle indicate whether the corresponding 8-bit word resides in the odd memory module 22 or the even memory module 24, respectively, and the /8 or /16 after the upper and lower system addresses indicates whether the system is being accessed in an 8-bit mode or a 16-bit mode. In the 8-bit mode, only the lower order eight bits of the 16-bit data-in or data-out signal comprise the data word. In the 16-bit mode, the entire 16 bits comprise the data word, with the low order eight bits (0–7) forming the lower order byte and the high order 8-bits (8–15) forming the high order byte. An example of each scheme is shown in FIG. 3 wherein the words defined by system addresses 230 and 231 in 8-bit mode (all addresses are in hexadecimal unless stated otherwise) are seen to comprise the data corresponding to memory locations 118 in the even (E) memory module 24 and the odd (O) memory module 22, respectively, and wherein the words defined by the same system addresses in 16-bit mode are seen to comprise data from each memory module. (Note that the module address is the system address divided by two with the remainder indicating which of the two modules is to be selected.) The order of the data within each 16-bit signal of FIG. 3 is important and it is a significant feature of the present invention that the order is maintained automatically irrespective of the mode of memory access.

Considering now FIGS. 1, 2, and 3 together, the operation of the memory system of the present invention is described, first, with respect to an 8-bit access, and second, with respect to a 16-bit access. Because of the conventional nature of most of the components of the system of FIG. 1, a description of their operation will be sufficient for those persons skilled in the art to understand and practice the invention. The control circuit 38 is defined by the sum of its disclosed operational characteristics with the understanding that the actual implementation of the circuit may be by any suitable means. To access the system of FIG. 1 in the 8-bit internal mode, signals representative of the 8-bit and internal mode selection, a read or write operation, and the address of the memory location to be accessed are impressed on signal lines 50, 51, 52, and 34, respectively. Responsive to the 8-bit mode signal, the control circuit 38 disables the incrementor 36 to permit the upper 15 bits of the address signal to be passed unincremented to the even memory modules 24; the 15-bit address being applied to the odd memory module 22 directly from line 34. The control circuit also receives the least significant bit of the address signal via line 70 to determine if the location to be accessed is in the odd memory module 22 or the even memory module 24. (Note that removing the least significant bit from a binary number is equivalent to dividing the number by two with the removed bit being the remainder.) If the least significant bit of the address signal is a 0, or of even sense, the access is to the even memory module 24 and only that module is activated to receive a data signal from the input mux 28 for a write operation or to transmit a data signal to the output mux 32 for a read operation. In either case, the data signal is passed through the respective mux in a parallel manner without change; that is, with the lower eight bits of an input signal being passed through the input mux signal paths labeled 0–7 to signal line 54 for a write operation, and the eight bits of the signal from the memory module 24 being passed through the output mux signal paths also labeled 0–7 to signal line 60 for a read operation. (The upper eight bits of an input or output data signal are not used in the 8-bit mode.) If the least significant bit of the address signal is a 1, or of odd sense, only the odd memory module 22 is activated and the data signals are switched as they pass through the respective mux's.

As an example, referring to FIG. 3, an even system address of 230/8, translating to 0000 0010 0011 0000 in binary, has 15 upper bits defining a module address of 118, and a least significant bit defining the access as being to the even memory module 24. Similarly, an odd system address of 231/8, translating in binary to 0000 0010 0011 0001, defines a modular address again of 118, only this time with access to the odd memory module 22. Upon sensing the logical 1 present as the least significant bit of the odd system address, the control circuit 38 activates the odd memory module 22 as indicated earlier and then activates the appropriate mux 28 or 32 to cross or switch the data signal as it passes therethrough, that is, the lower eight bits of an input signal are switched through signal paths 0–7 of mux 28 to signal line 58 and the eight bits of an output data signal are switched through signal paths 0–7 of mux 32 to signal line 60. In this manner, the logical relationship of the data signals, as indicated by the leftmost two diagrams of FIG. 3, is automatically maintained.

For an 8-bit access to the 65K 8-bit external memory 40, the full 16 bits of the address signal are employed as the memory is not divided physically into odd and even halves. In this case, the address signal is sent unincremented to the memory via signal line 64 and the two mux's 28, 32 are maintained so as to pass the input data signal to line 54, and the output signal, via latch circuit 44 to be discussed in more detail later, to line 60, with no differentiation being made between odd and even memory addresses.

Access to the memory modules 22, 24 in the 16-bit mode is similar to that for the 8-bit mode with the exception that an incrementing operation is selectively performed on the address signal and a full 16-bit data signal is passed for each access. During each access, the address signal destined for the even memory module 24 is incremented by one before its upper 15 bits are applied to the memory. The purpose of the incrementing operation it to permit 16-bit access to the system memory across the 8-bit boundaries of the individual memory modules while still maintaining logical interrelationship between the two bytes of each 16-bit word. Referring again to FIGS. 2 and 3, it is seen that an address signal of 230/16 corresponds to an address of 118 in both the odd memory module 22 and the even module 24, with the odd module 22 supplying the lower eight bits of the resultant data signal and the even module 24 supplying the upper eight bits. For an address signal of 231/16, the corresponding module addresses are 118 in the odd memory module 22 and 119 in the even memory module 24, and the odd/even order within the resultant data signal is reversed. In the general case, a 16-bit memory access to system address will result in an access to both modules 22, 24 at a module address of N/2 if N is even, and an access to module 22 at an address defined by the integer part of N/2 and an access to module 24 at an address defined by the integer part of (N+1)/2 if N is odd.

Again, the operation of a 16-bit memory access is best described by way of example. Consider first an even address of 230/16 which translates in binary, as before, to 0000 0010 0011 0000. Upon receipt, the upper 15 bits of the address signal are sent unchanged to the odd memory module 22. Assuming receipt also at the control circuit of the least significant address bit via line 70, the address signal is also fed through the incrementor 36 where it is now incremented by one. The upper 15 bits of the incremented address signal are then sent to the even memory module 24. Responsive to the least significant bit of 0 from the address line 70, the control circuit causes the two mux's 28, 32 to cross the two data signals and activates the memory modules 22, 24. The appropriate read or write operation is then performed with the 16-bit data signals passing through the two mux's 28, 32 in a cross-over fashion. Because the upper 15 bits of an even address signal do not change when a 16-bit signal is incremented by one, the access to both memory modules is at location 118.

Consider now an access to odd system address 231/16. As before, the upper 15 bits of the address signal are sent unchanged to the odd memory module 22 and the least significant bit is sent to the control circuit 38. At the same time, the address signal is incremented, also as before, with the upper 15 bits of the incremented signal being sent to the even memory module 24. Responsive to the least significant bit of 1, the control circuit 38 causes the appropriate mux 28, 32 to leave its two data paths uncrossed and activates the memory modules 22, 24 to perform the appropriate read or write operation. As before, the upper 15 bits of the received address signal correspond to a module address of 118, but now the upper 15 bits of the incremented address signal are changed, from 0000 0010 0011 000 to 0000 0010 0011 001, and the access to the even memory module 24 is at location 119. The selective crossing of the data signals through each of the mux's depending on the value of the least significant bit of the address signal again ensures that the desired logical relationship of each byte within the 16-bit data word is preserved.

To access the 65K external memory 40 in the 16-bit mode, the operation is performed sequentially. For a write operation, the address incrementor 36 is disabled, the mux 28 is switched and the upper 8 bits of the input data signal are sent at time $t_1$ to the location defined by the 16-bit address signal on line 64. The address incrementor is then enabled, the mux 28 is unswitched and the lower eight bits of the data signal are sent at time $t_2$ to the location defined by the incremented address signal also on line 64. For a read operation, the data at the received address location is sent at time $t_1$ to an 8-bit latch circuit 42 where it is held while the data at the incremented address location is sent at time $t_2$ to a second latch circuit 44. The latched circuits are then activated by the control circuit 38 to release the combined 16-bit signal to the mux 32. As the output data lines are always in the proper order, no switching of the mux 32 is necessary. Alternatively, the output signals could be sent to the mux on a single data line and switched as required.

It is noted that any bit of the address signal may be chosen as the sense indicator, the least significant bit being chosen for ease of understanding.

Referring now to FIG. 4, there is shown a second exemplary embodiment of the memory system of the present invention differing from the first primarily by its use of bidirectional signal lines to decrease the overall complexity. As disclosed, the system of FIG. 4 includes a first internal memory module 122 (designated "ODD"), a second internal memory module 124 (designated "EVEN"), a data/address input/output signal line 126 and associated bidirectional multiplexer (mux) 128, an address latch 135, an address incrementer 136, and a control circuit 138. Also shown are an external memory module 140 and its associated latch circuit 142 and buffer circuit 144. As before, each of the data and address signal lines interconnecting the various components of the system have been labeled with a numeral 1, 8, 15, or 16 and a diagonal mark to indicate the number of separate data paths contained within the respective line. Also as before, the memory modules 122, 124, and 140 have been labeled to indicate an illustrative capacity of 32k or 65k 8-bit words. Except for the bidirectional nature of the data signal lines and the mux 128, the operation of the system of FIG. 4 is very similar to that of FIG. 1 and the earlier discussion regarding FIGS. 2 and 3, as well as the figures themselves, still applies.

To access the system of FIG. 4 in the 8-bit mode, signals representative of the 8-bit internal mode selections, a read or write operation, and the address of the memory location to be accessed are impressed on signals lines 150, 151, 152, and 134, respectively. Responsive to the 8-bit mode signal, the control circuit 138 disables the address incrementer 136 and causes the upper 15 bits of the address signal to be passed to both of the memory modules 122, 124, and the least significant bit to be passed to the control circuit. (In the 8-bit access mode, the incrementer circuit 136 acts as a simple pass through circuit.) If the least significant bit of the address signal is a zero, the even memory module 124 is activated to receive a data signal from the mux 128 for a write operational or to transmit a data signal to the same mux for a read operation. In either case, the data signal is passed through the mux in a parallel manner without change. If the least significant bit of the address signal is a one, the odd memory module 122 is activated and the mux 128 is energized so as to switch the data as it passes therethrough.

For an 8-bit access to the 65k 8-bit external memory 140, the address signal is sent to the memory via the still disabled incrementer 136 and the address line 164, and the data is passed into or out of the memory via the mux 128 and the buffer circuit 144. There is no crossing of the data as it passes through the mux as there is no physical difference between odd and even memory addresses.

Operation of the internal memory system of FIG. 4 in the 16-bit mode is also analogous to that of system of FIG. 1 except for the bidirectional aspects of the data lines and mux 128. During each even access, the upper 15 bits of the address signal are applied to each memory module 122, 124 without change, and during each odd access, the address signal is incremented before its upper 15 bits are applied to the even module 124, the address signal applied to the odd module 122 remaining unchanged. The least significant bit of the original address is still used to determine whether the mux 128 is activated to cross the data signals as they enter and leave the system. Operation of the 65k external memory is a bit different, however, in that, for a write operation, each 8-bit byte of the 16-bit data signal is transferred one at a time to the 8-bit buffer 144 for sequential storage at the locations identified by the address signal as received and as incremented, and, for a read operation, the data from the accessed location is sent to the latch 142 and the data from the next higher location is sent to the buffer 144 for parallel transfer to the mux 128.

Certain timing considerations are necessary to effect the ordered operation of either disclosed embodiment of the present invention. Such timing considerations, and the means for their incorporation in the disclosed systems, will be apparent to those persons skilled in the art and may be assumed herein for purposes of complete disclosure.

As indicated earlier, it is understood that the scope of the invention is not limited to a system of 8-bit and 16-bit data signals but includes in general a system of N-bit and 2N-bit signals, where N is a positive integer.

The terms and expressions which have been used in the foregoing specification are used therein as terms of description and not of limitation, and there is no intention, in the use of such expressions, of excluding equivalents of the features shown and described or portions thereof, it being recognized that the scope of the invention is defined and limited only by the claims which follow.

We claim as our invention:

1. A memory access system comprising:
   (a) first and second memory modules each having M locations for storing a byte of digital information, with each said storage location being accessible via a different system address signal, said memory modules defining in concept a single memory space of 2M storage locations ordered such that each said location in each said module represents a next sequential location for a different said location in the other said module;
   (b) means for receiving a system address signal defining a storage location to be accessed;
   (c) means for receiving a control signal defining a memory operation to be performed;
   (d) means responsive to said control signal and said system address signal for simultaneously accessing a first storage location defined by said address signal in one of said memory modules and a next sequential storage location in the other of said memory modules irrespective of which of said first and second memory modules contains said first storage location; and
   (e) means also responsive to said control signal and said system address signal for simultaneously transferring a first byte of digital information into or out of said first storage location and a second byte of digital information into or out of said next sequential storage location while maintaining a predetermined logical interrelationship between said first and second digital bytes, also irrespective of which of said memory modules contains said first storage location.

2. The memory access system of claim 1 wherein the storage locations of said first and second memory modules are defined as odd and even, respectively, and wherein said means (d) includes means responsive to a system address signal of even value N for accessing a storage location in each said memory module at a module address defined by N/2.

3. The memory access system of claim 2 wherein said means (d) further includes means responsive to a system address signal of odd value N for accessing a first storage location in said first memory module at a module address defined by the integer part of N/2 and at a second storage location in said second memory module at module address defined by the integer part of (N+1)/2.

4. The memory access system of claim 1 wherein said means (e) includes means for simultaneously transferring said first and second bytes of digital information into or out of said first and next sequential storage locations, respectively, as a two-byte word of digital information, with the upper byte of said word being defined by said first byte and the lower byte of said word being defined by said second byte irrespective of which of said first and second memory modules contains said first storage location.

5. The memory access system of claim 4 wherein each said byte of digital information is n digital bits long and wherein the n bits of said first byte form the high-order n bits of said word and the n bits of said second byte form the low-order n bits of said byte.

6. A method of accessing a digital memory system comprising the steps of:
   (a) providing first and second memory modules each having M locations for storing a byte of digital information, with each said storage location in each said module being accessible via a different system address signal, said memory modules defining in concept a single memory space of 2M storage locations ordered such that each said location in each said module represents a next sequential location for a different said location in the other said module;
   (b) receiving a system address signal defining a storage location to be accessed;
   (c) receiving a control signal defining a memory operation to be performed;
   (d) responsive to the receipt of a said control signal and a said system address signal, simultaneously accessing a first storage location defined by said address signal in one of said memory modules and a next sequential storage location in the other of said memory modules irrespective of which of said first and second memory modules contains said first storage location; and (e) also responsive to the receipt of a said control signal and a said system address signal, simultaneously transferring a first byte of digital information into or out of said first storage location and a second byte of digital information into or out of said next sequential storage location while maintaining a predetermined logical interrelationship between said first and second digital bytes, also irrespective of which of said memory modules contains said first storage location.

7. The memory access method of claim 6 wherein said step (d) includes, responsive to a system address signal of even value N, accessing a storage location in each said memory module at a module address defined by N/2 and, responsive to a system address signal of odd value N, accessing a first storage location in said first memory module at a module address defined by the interger part of N/2 and at a second storage location in said second memory module at a module address defined by the interger part of (N+1)/2.

8. The memory access method of claim 6 wherein said step (e) includes transferring said first and second bytes of digital information into or out of said storage locations as a two-byte word of digital information, with the upper byte of said word being defined by said first byte and the lower byte of said word being defined by said second byte irrespective of which of said first and second memory modules contains said first storage location.

* * * * *